(12) United States Patent
Thompson et al.

(10) Patent No.: US 9,951,841 B2
(45) Date of Patent: Apr. 24, 2018

(54) DAMPING FLUID DEVICES, SYSTEMS AND METHODS

(71) Applicant: LORD Corporation, Cary, NC (US)

(72) Inventors: Scott K. Thompson, Erie, PA (US); David R. Dobbs, Erie, PA (US); Haris Halilovic, Erie, PA (US); Christopher Wyant, Townville, PA (US)

(73) Assignee: LORD Corporation, Cary, NC (US)

( * ) Notice: Subject to any disclaimer, the term of this patent is extended or adjusted under 35 U.S.C. 154(b) by 0 days.

(21) Appl. No.: 15/034,461

(22) PCT Filed: Aug. 11, 2014

(86) PCT No.: PCT/US2014/050500
§ 371 (c)(1),
(2) Date: May 4, 2016

(87) PCT Pub. No.: WO2015/076879
PCT Pub. Date: May 28, 2015

(65) Prior Publication Data
US 2016/0273608 A1    Sep. 22, 2016

Related U.S. Application Data (60) Provisional application No. 61/941,650, filed on Feb. 19, 2014, provisional application No. 61/908,199, filed on Nov. 25, 2013.

(51) Int. Cl.
*F16F 5/00* (2006.01)
*F16F 13/08* (2006.01)
(Continued)

(52) U.S. Cl.
CPC ............ *F16F 13/08* (2013.01); *F16F 13/103* (2013.01); *B62D 33/0604* (2013.01); *F16F 2226/04* (2013.01); *F16F 2230/00* (2013.01)

(58) Field of Classification Search
CPC .......... F16F 13/04; F16F 13/08; F16F 13/085; F16F 13/103; F16F 13/108; F16F 13/10; F16F 2226/04; F16F 9/0463
(Continued)

(56) References Cited

U.S. PATENT DOCUMENTS 4,610,438 A * 9/1986 Eberhard ................ F16F 13/08
138/31
4,787,608 A * 11/1988 Elliott ................... F16F 9/0454
152/452
(Continued)

FOREIGN PATENT DOCUMENTS

DE    3522333 A1 *  1/1987 .............. F16F 13/08
DE    4335510 A1 *  5/1994 ........... B60K 5/1208
(Continued)

OTHER PUBLICATIONS

Machine translation of DE 3522333 (no date).*
Machine translation of DE 4335510 (no date).*

*Primary Examiner* — Nicholas J Lane (57) ABSTRACT

The present subject matter relates to improved damping fluid mount devices, systems, and methods in which a damping fluid mount (100) includes an inner member (110), an elastomer section (130) that is affixed to an outer surface of the inner member (110), and a cup (200) containing viscous fluid (300). The elastomer section (130) has an outer diameter that is variable along an elastomer contour, and a crimped portion of the cup is radially crimped into the elastomer section (130) such that the crimped portion precompresses the elastomer section (130) and substantially mimics the elastomer contour.

18 Claims, 10 Drawing Sheets

(51) Int. Cl.
  *F16F 13/10*  (2006.01)
  *B62D 33/06*  (2006.01)

(58) Field of Classification Search
  USPC .......................... 267/140.13, 140.12, 140.15
  See application file for complete search history.

(56) References Cited

U.S. PATENT DOCUMENTS

| | | | | |
|---|---|---|---|---|
| 4,957,279 | A * | 9/1990 | Thorn | F16F 13/04 |
| | | | | 248/562 |
| 2003/0047882 | A1* | 3/2003 | Nakada | F16F 13/08 |
| | | | | 277/628 |
| 2005/0056980 | A1* | 3/2005 | Kuzukawa | F16F 13/08 |
| | | | | 267/140.4 |
| 2008/0164645 | A1* | 7/2008 | Bost | F16F 1/3814 |
| | | | | 267/140.12 |
| 2009/0014930 | A1* | 1/2009 | Kuzukawa | F16F 13/10 |
| | | | | 267/140.13 |
| 2011/0169204 | A1* | 7/2011 | Catanzarite | F16F 13/007 |
| | | | | 267/140.13 |
| 2012/0049038 | A1* | 3/2012 | Bachmeyer | F16F 13/007 |
| | | | | 248/624 |

FOREIGN PATENT DOCUMENTS

| | | |
|---|---|---|
| EP | 1457705 | 9/2004 |
| EP | 1950451 | 7/2008 |

\* cited by examiner

DAMPING FLUID DEVICES, SYSTEMS AND METHODS

CROSS-REFERENCE

This application claims the benefit of, and incorporates by reference, U.S. Provisional Patent Application No. 61/908,199 filed on Nov. 25, 2013, and U.S. Provisional Patent Application No. 61/941,650 filed on Feb. 19, 2014.

TECHNICAL FIELD

The subject matter disclosed herein relates to devices, systems, and methods for reducing and controlling gross vehicle cab vibrations. More particularly, the subject matter disclosed herein relates to devices, systems and methods for reducing and controlling movement in off-highway cabs, particularly for reducing vibration and increasing high-frequency isolation in off-highway cabs.

BACKGROUND

Gross off-highway cab movement and vibration are particularly troublesome in that they can cause fatigue and wear on the equipment. In cabs of industrial vehicles or construction equipment, vibrations are particularly problematic in that they create multiple fatigue and wear points. In addition to the fatigue and wear on the equipment, the same movement and vibration causes fatigue to the operator and interferes with the operator's ability to operate the equipment.

Broadband damping provides damping across a large spectrum of vibrational frequencies. Narrowband damping provides for a narrow vibrational band and/or only providing damping at low or high vibrational frequencies. Broadband damping is usually achieved by using annular damping and a higher viscosity fluid, which results in damping across a wide range of frequencies. Narrowband damping is usually achieved by using a low viscosity fluid in a long orifice so that fluid can resonate within the orifice and have a distinct natural frequency.

There is a need for an improved device that reduces gross vibration and movement in off-highway vehicle cabs, yet is durable and/or can be manufactured in a cost-effective manner.

SUMMARY

In accordance with this disclosure, improved damping fluid mount devices, systems and methods are provided, for example with a damping fluid mount and a method or process for assembling a fluid mount easily adaptable to different static load and damping fluid mount configurations.

In one aspect, the present subject matter provides a damping fluid mount, which includes an inner member, an elastomer section that is affixed to an outer surface of the inner member, and a cup containing viscous fluid, a crimped portion of the cup being radially crimped into the elastomer section such that the crimped portion precompresses the elastomer section and substantially mimics the elastomer contour. The elastomer section has an outer diameter that is variable along an elastomer contour. The elastomer section may be affixed to the outer surface of the inner member by being bonded or rigidly affixed thereto. Bonding may include vulcanization or adhesive bonding.

In another aspect, a method for assembling a damping fluid mount is provided. The method includes coupling an elastomer section to an outer surface of an inner member, inserting the elastomer section coupled to the inner member into a cup, wherein the cup contains a quantity of viscous fluid, and radially crimping a portion of the cup to form a crimped portion that extends into an elastomer contour disposed on an exterior surface of the elastomer section. Crimping the portion of the cup radially precompresses the elastomer section and decreases an inner diameter of the crimped portion of the cup so that the inner diameter of the cup substantially mimics the elastomer contour.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

DETAILED DESCRIPTION

The present subject matter provides improvement to vibration damping fluid mounts for use in off-highway vehicle cabs. The disclosed devices and methods manufacture a damping fluid mount that eliminates the need for an outer member. Instead, the fluid damping mount disclosed herein uses a crimped cup design that pre-compresses the elastomer section of the fluid mount, which provides a fluid mount with superior sealing, improved fatigue life, increased durability and improved high-frequency isolation.

Figure 1:
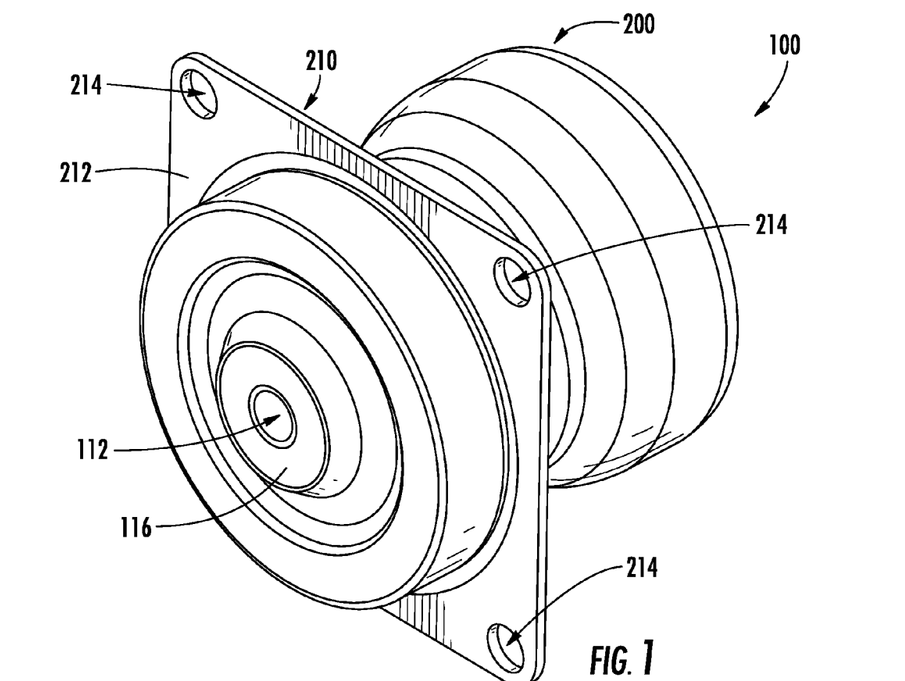
FIG. 1 is a perspective view of a damping fluid mount according to an embodiment of the presently disclosed subject matter.
Figure 2:
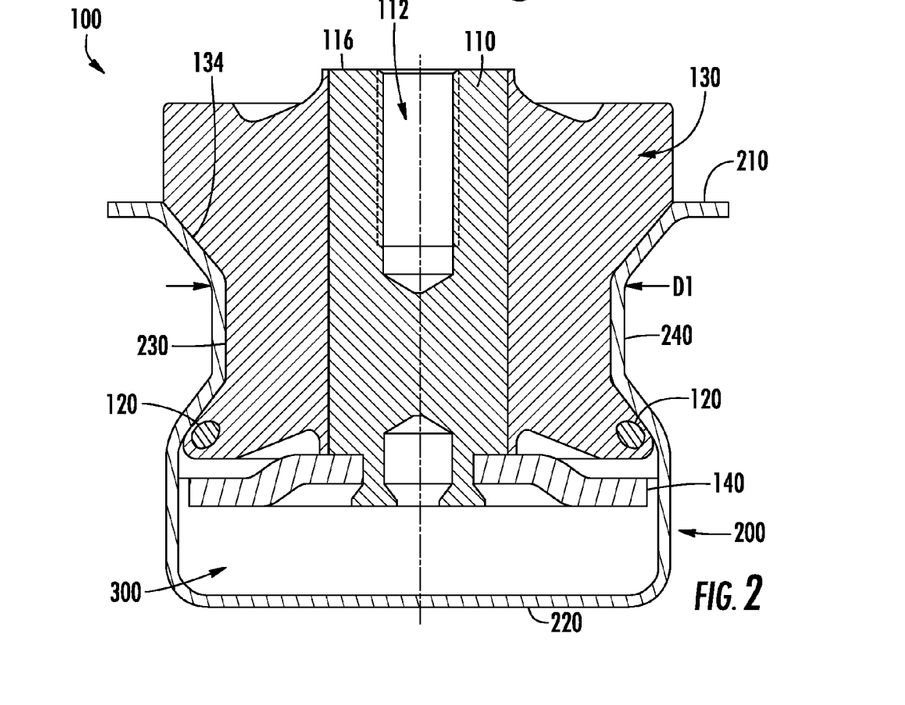
FIG. 2 is a sectional side view showing a damping fluid mount according to an embodiment of the presently disclosed subject matter.

In one exemplary configuration shown in FIGS. 1 and 2, the present subject matter provides a broadband damping fluid mount 100 contained by a radially crimped cup 200. The broadband damping fluid mount 100 comprises a bonded core that includes an inner member 110 and an elastomer section 130, where an inner surface of the elastomer section 130 is coupled to (e.g. bonded, adhered, friction fit, etc.) an outer surface of the inner member 110.

An outer surface of the elastomer section 130 comprises an elastomer contour 134 formed with a diameter that varies along a longitudinal axis of the elastomer section 130. In one aspect, a ring 120 is encapsulated or bonded within the elastomer section 130 and, in conjunction with the radially precompressed elastomer section 130, increases durability and damping of the fluid mount 100. In other aspects, the fluid mount 100 does not include the ring 120. Instead, these embodiments rely substantially on the radial crimp of the cup 200 and the elastomer section 130 to reduce relative motion at the crimped interface.

Figure 4:
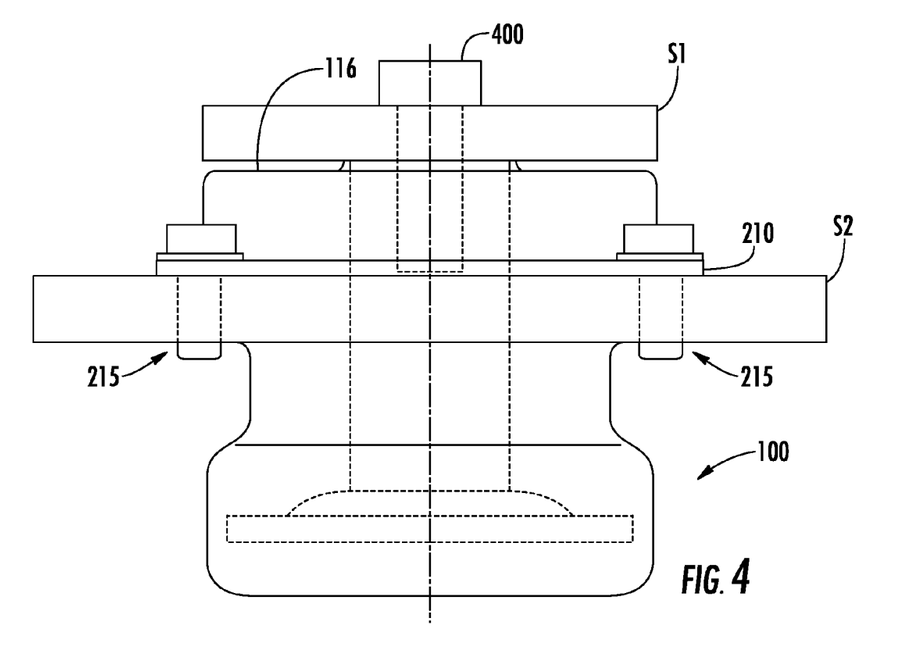
FIG. 4 is a side view of a damping fluid mount according to an embodiment of the presently disclosed subject matter.

In the fluid mount, an upper portion of the inner member 110 includes a blind threaded hole 112 configured to receive a retaining member 400 (e.g. a bolt as illustrated in FIG. 4), which in some embodiments is used for securing a supporting structure S1 (e.g., a cab of an off-highway vehicle) to the broadband damping fluid mount 100. In one aspect, the blind threaded hole 112 longitudinally extends from a top surface 116 of the inner member 110 towards a center of the inner member 110, for a specified depth, that varies based on the length, size and/or shape of the retaining member 400 being used. (See, e.g. FIGS. 2 and 4).

Figure 5:
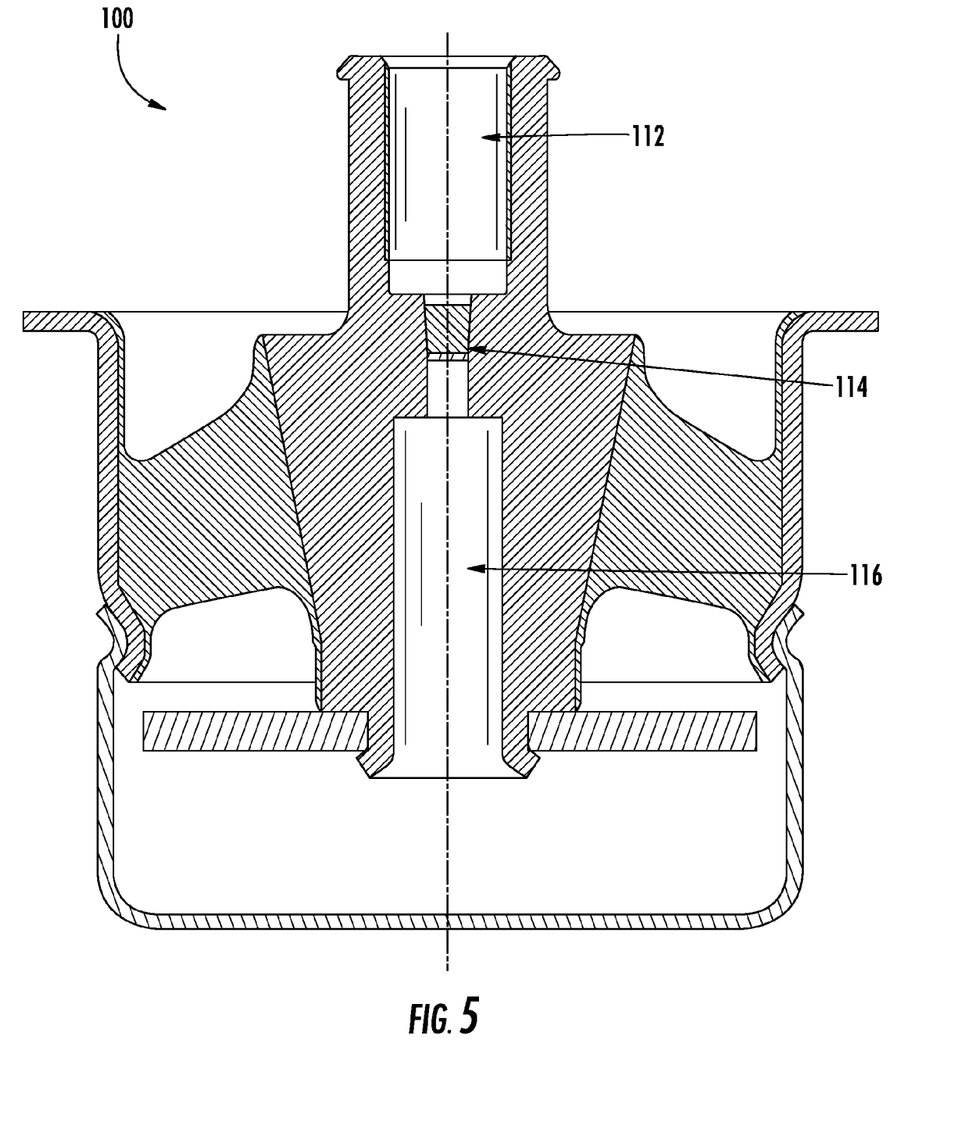
FIG. 5 is a sectional side view showing a damping fluid mount according to an embodiment of the presently disclosed subject matter.

The dimensions of the blind threaded hole 112 are selected based on the parameters of a given application. When blind threaded hole 112 is a through hole and the fluid mount 100 is sealed, the diameter and/or depth of the blind threaded hole 112 is selectable so that the volume of air available within the fluid mount 100 can be increased or decreased. The dimensions of the blind threaded hole 112 are selected during manufacturing. Alternatively, in some embodiments, the through hole of blind threaded hole 112 includes an adjustable air volume 116, which, is tuned by adjusting the height of a sealing plug 114. (See, e.g., FIG. 5)

In addition, in some embodiments, the broadband damping fluid mount 100 comprises a top plate assembly 150 that is interchangeable and modular for use in both roll over protection structure (ROPS) and non-ROPS applications. In the embodiments shown in FIGS. 6, 7A, and 7B, for example, the top plate assembly 150 further comprises a metallic washer 152, a mounting plate 154, and an elastomeric profile 156 defining an upper snubbing surface and a radial snubbing surface. As used herein, the term "snubbing" means reducing or stopping movement between fixed and movable portions of a vehicle (e.g., the frame and the cab) by absorbing kinetic energy therebetween via an elastomeric profile member of vehicle mount devices described herein. The profile part can include snubbing surfaces for absorbing and/or dissipating kinetic energy. Thus, in some aspects "snubbing" is a form of shock absorbing.

Figure 7A:
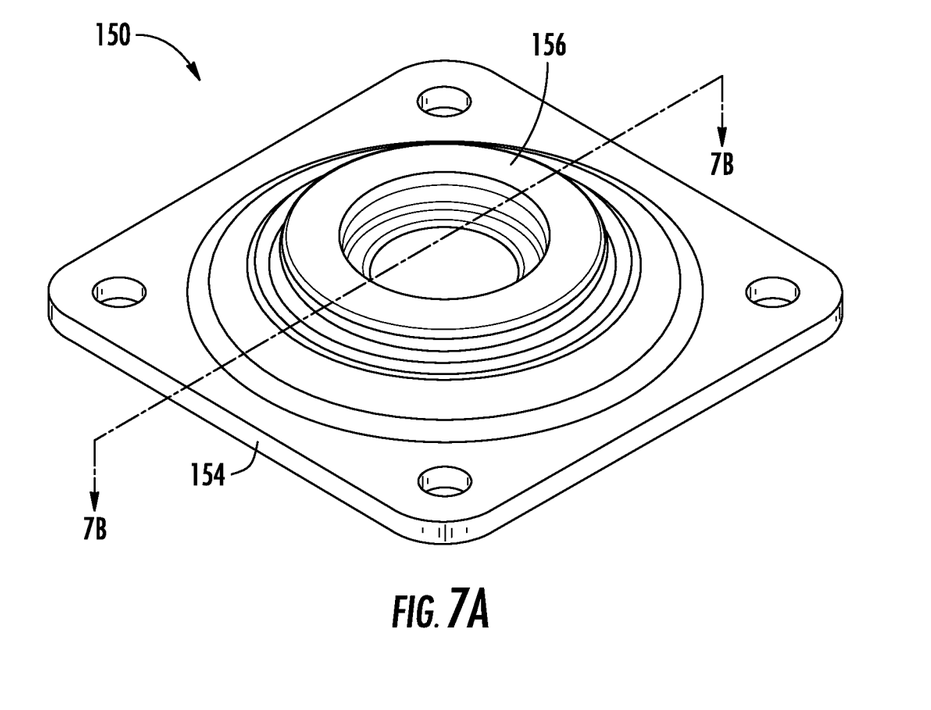
FIG. 7A is a perspective top view of a mounting plate for a modular top plate assembly for a damping fluid mount according to an embodiment of the presently disclosed subject matter.
Figure 7B:
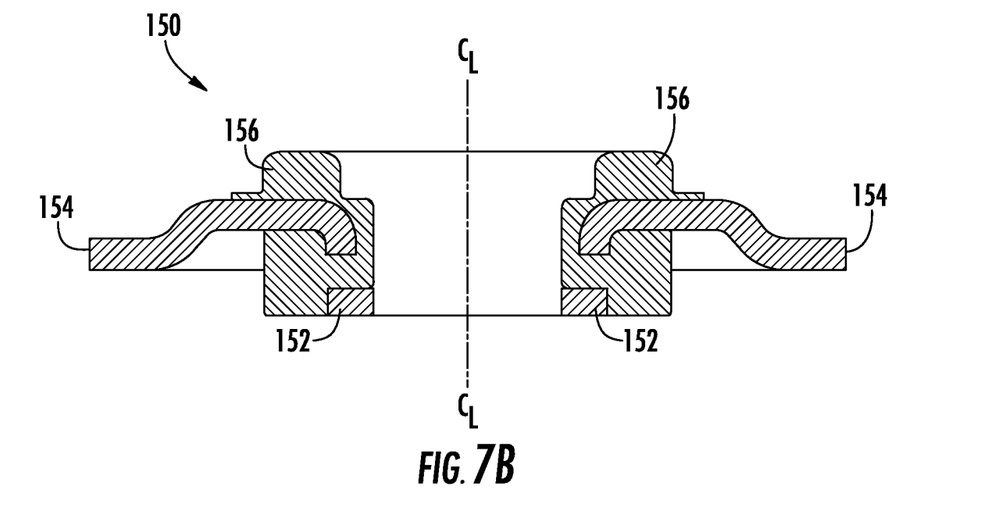
FIG. 7B is a sectional side view of a mounting plate for a modular top plate assembly for a damping fluid mount according to an embodiment of the presently disclosed subject matter.
Figure 8:
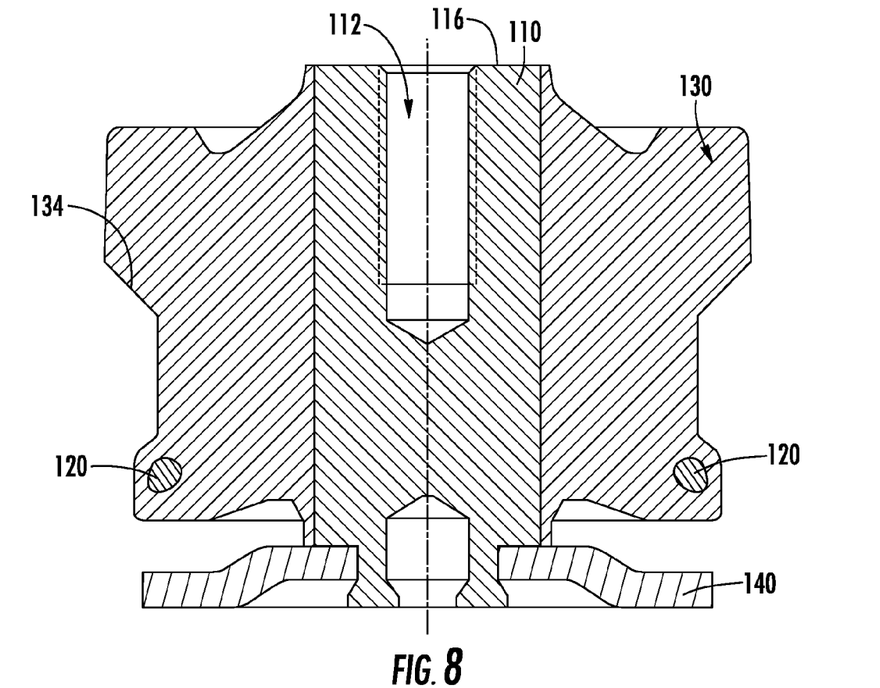
FIGS. 8-10 are sectional views showing in detail a method of assembling a damping fluid mount according to an embodiment of the presently disclosed subject matter.
Figure 9:
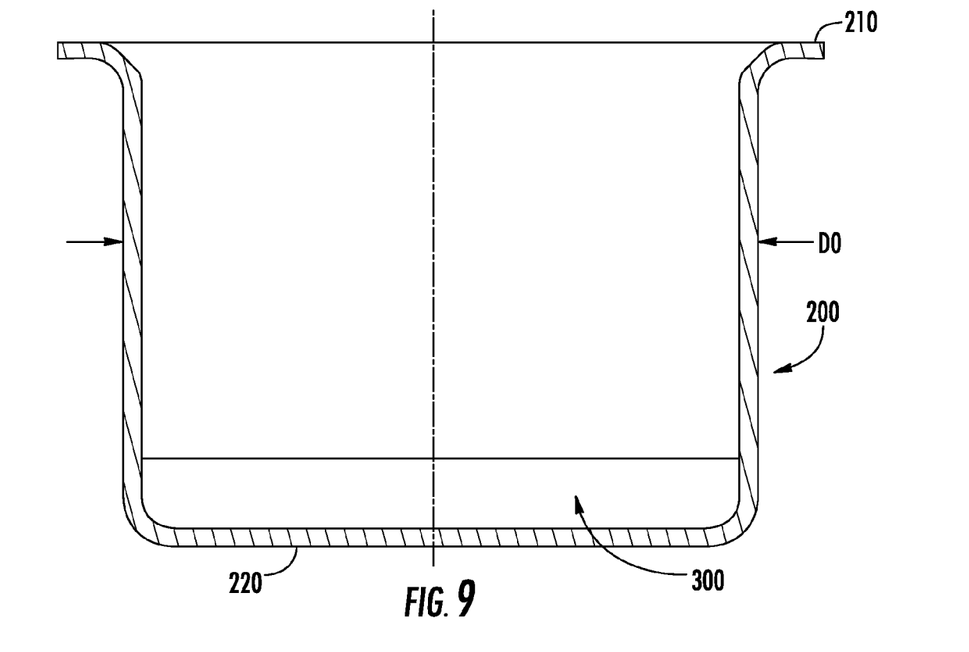
Figure 10:
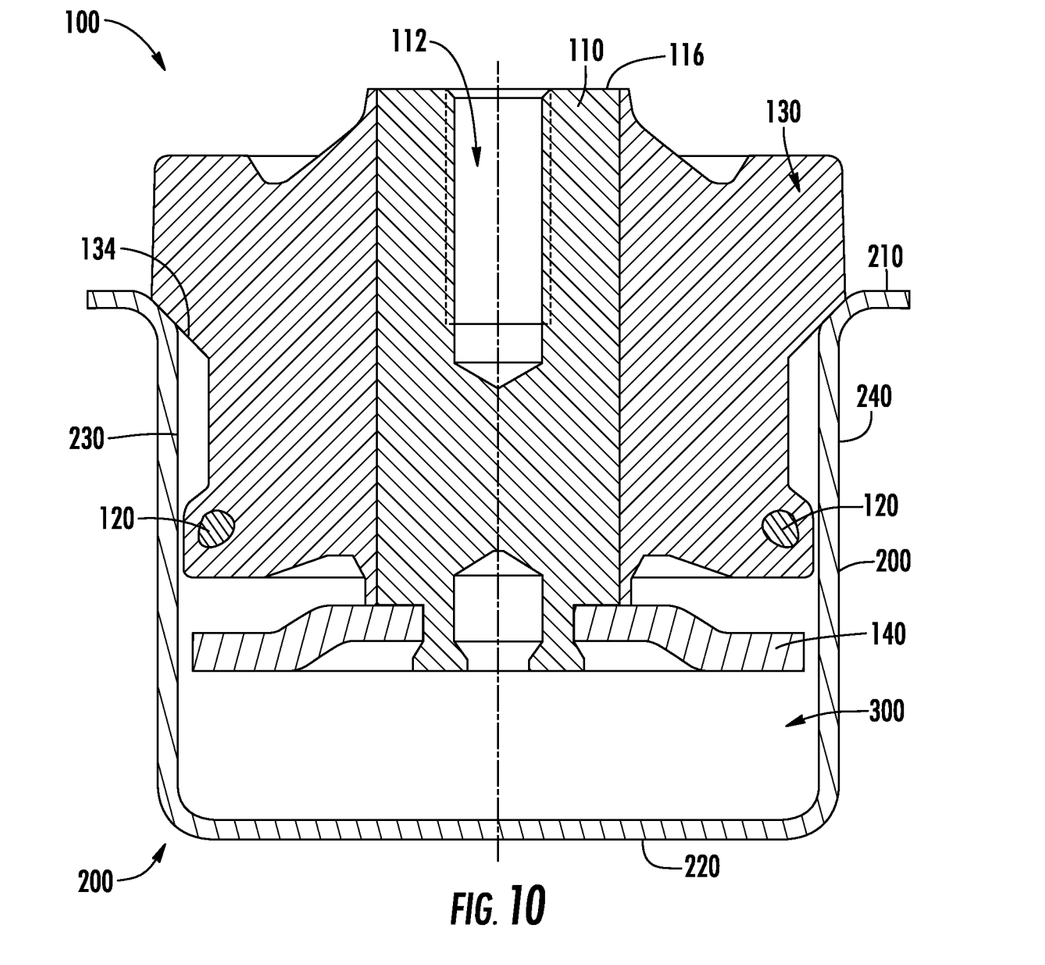
Figure 11:
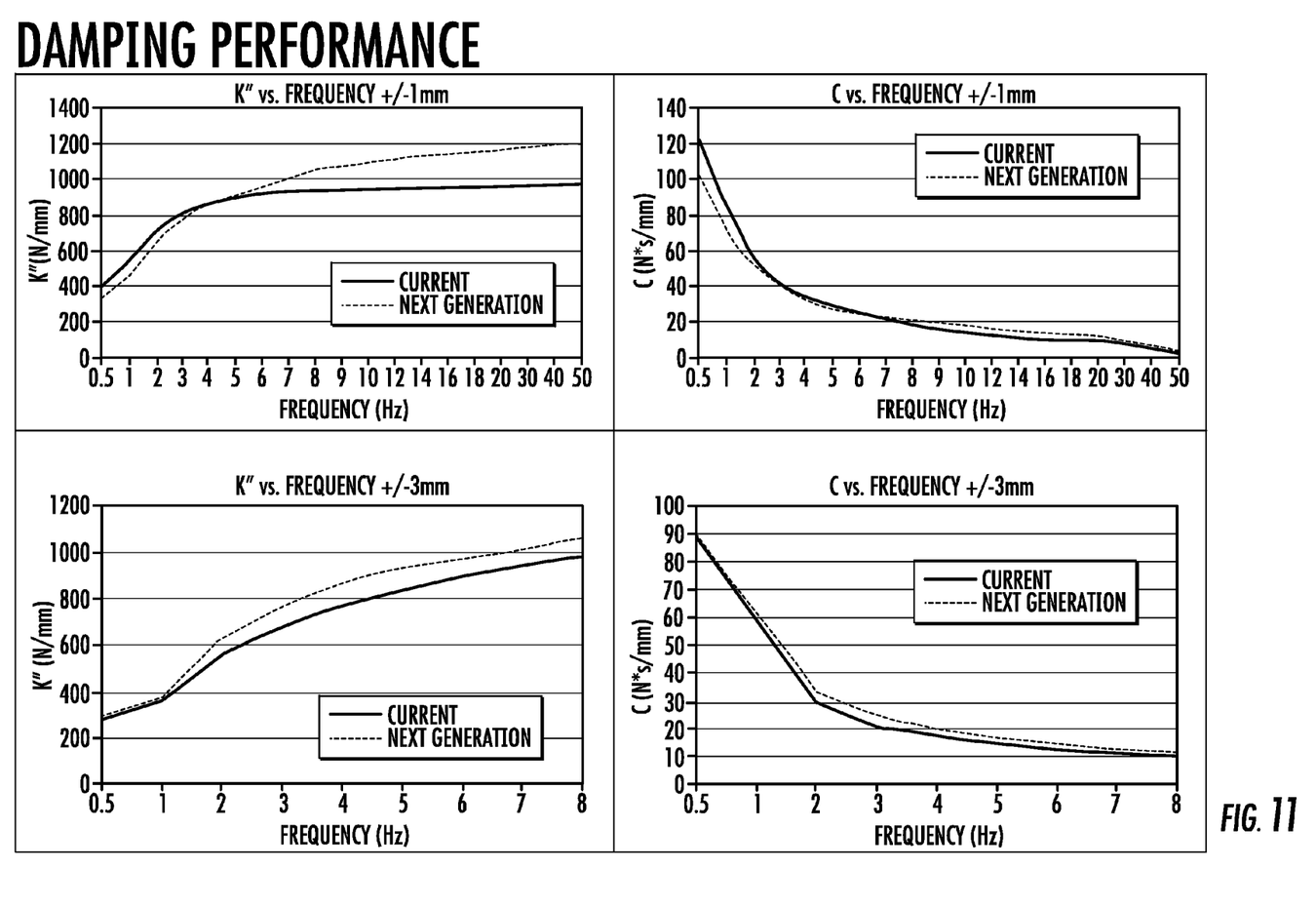
FIG. 11 illustrates damping test results from the next generation exemplary damper.
Figure 12:
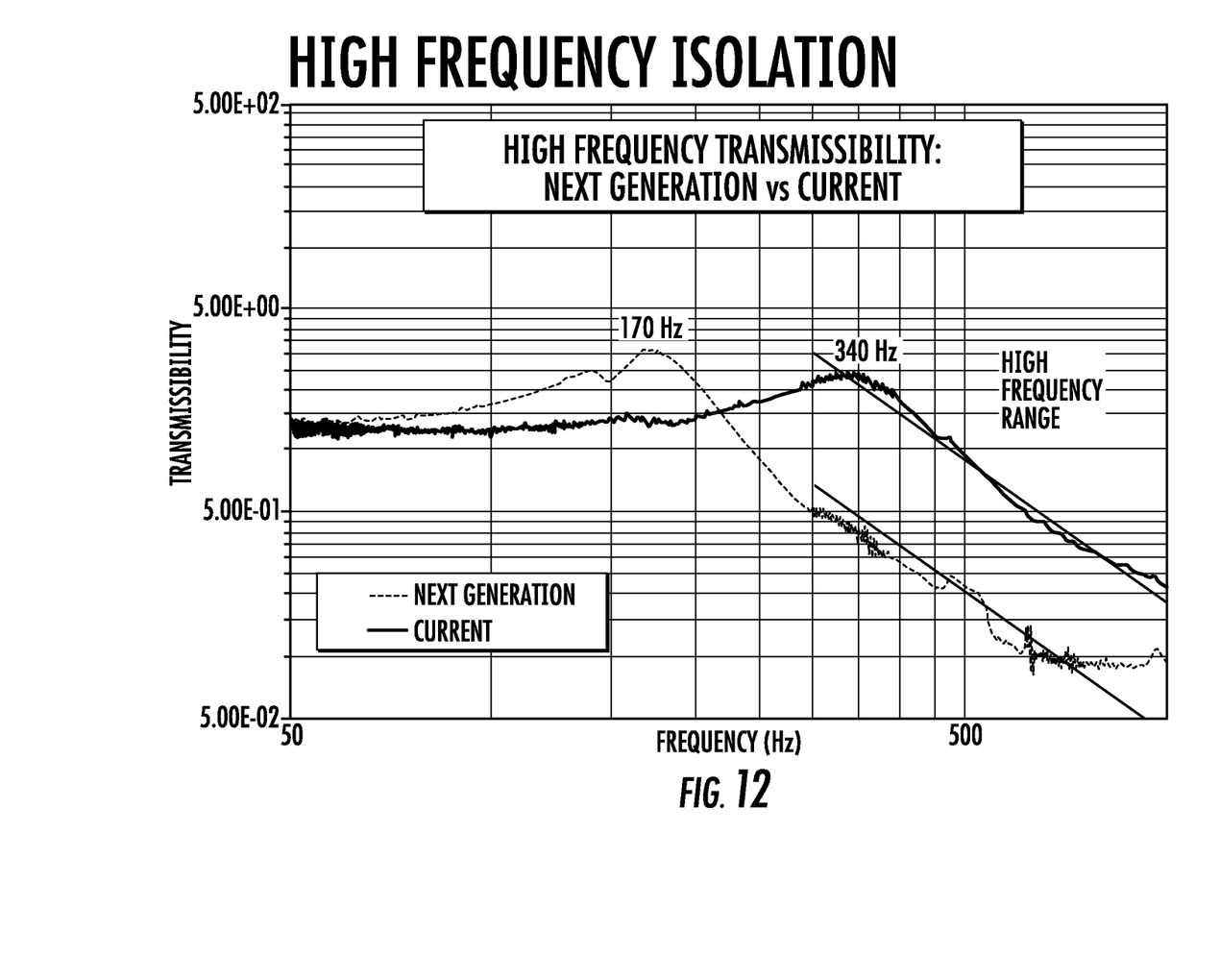
FIG. 12 illustrates comparative test data for high frequency isolation between the next generation exemplary damper and existing dampers.
Figure 13:
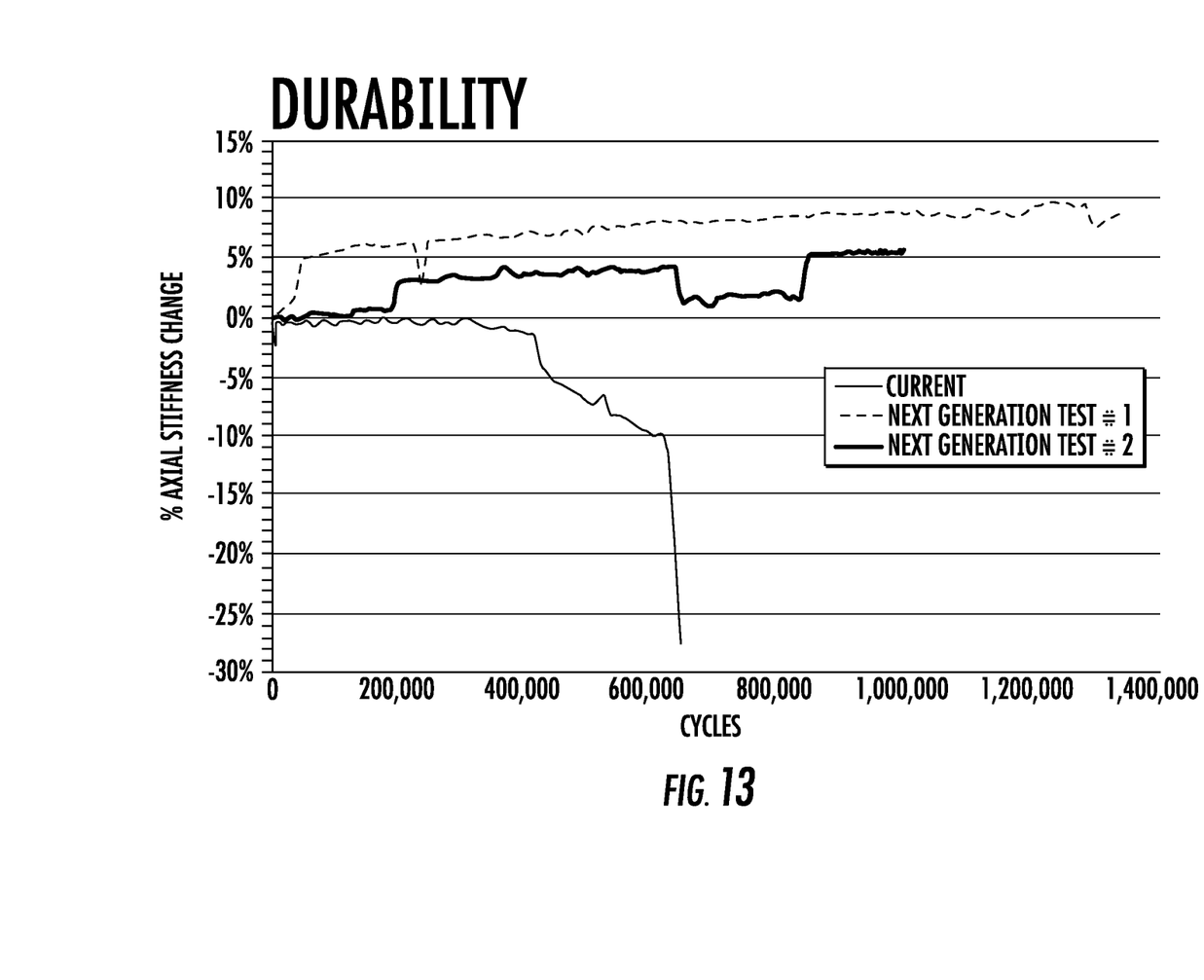
FIG. 13 illustrates comparative test data for durability between the next generation exemplary damper and existing dampers.

FIGS. 7A and 7B are perspective and sectional views, respectively, of the top plate assembly 150 configured for connection to the broadband damping fluid mount 100. The top plate assembly 150 as illustrated is modular and includes a mounting plate 154, which is illustrated as being modular, and an elastomeric profile 156, allowing for gross motion control to be moved external with respect to the broadband damping fluid mount 100. That is, gross motion control (e.g., shock absorption) of the vehicle cab with respect to the frame of the vehicle is limited or reduced via incorporation of an energy absorbing or dissipating elastomeric profile 156 within the top plate assembly 150. In some aspects, the elastomeric profile 156 includes an elastomeric material configured to control motion of a vehicle cab with respect to a vehicle frame via one or more snubbing contact surfaces. In some aspects, motion controlled snubbing is solely performed by the elastomeric profile 156 of the top plate assembly 150. This allows an easily achievable and readily available method of changing motion control characteristics of the broadband damping fluid mount 100 in a modular fashion without changing the low displacement natural frequency of the mount.

As illustrated by FIG. 7B, the elastomeric profile 156 includes a first snubbing contact surface (downward-facing surface in FIG. 7B), a second snubbing contact surface (upward-facing surface in FIG. 7B), and a third snubbing surface that is positioned radially-inward on the elastomeric profile 156. Upward and downward snubbing contact surfaces are adapted to control axial upward and downward motion, and are customizable during manufacturing for adapting to application needs via altering the contact locations of the elastomeric profile 156. As used herein, customizable refers to the specific vehicle size, weight, use and ride characteristics desired by the customer. The top plate assembly 150 also allows the possibility of a modular ROPS plate to be incorporated therein.

The elastomeric profile 156 includes an annular shaped ring that is symmetric about a centerline $C_L$ of the top plate assembly 150, and it also includes a central aperture adapted to receive and retain portions of the inner member 110. In some aspects, a portion of the second snubbing contact surface includes metal, for example, a metallic washer 152 configured to contact portions of the inner member 110 of the broadband damping fluid mount 100. For example, the metallic washer 152 can contact a surface of the inner member 110 and/or an upper portion of the elastomer section 130 for upward snubbing. This also provides the added benefit of adjusting the upward snubbing stiffness by simply altering the outer diameter of metallic washer 152 bonded in elastomeric profile 156 or section.

Mounting plate 154 of top plate assembly 150 includes at least one mounting surface and one or more openings or mounting holes provided therein. Mounting plate 154 is illustrated as a substantially square in shape, but those having skill in the art will recognize that any of a variety of other shapes are contemplated. Further in this regard, any thickness of mounting plate 154 is also contemplated. The one or more mounting holes are adapted to receive one or more retaining for attaching broadband damping fluid mount 100 and/or top plate assembly 150 to a further support structure (e.g., a supporting frame structure S2, FIG. 4) via mounting plate 154. In some aspects, four mounting holes are provided, where each hole is positioned substantially equidistant from one another at one corner of the mounting surface of top plate assembly 150. However, any size, shape, and/or quantity of mounting holes is contemplated.

In some aspects, interchangeable ROPS and non-ROPS configurations of mounting plate 154 are used thereby allowing broadband damping fluid mount 100 to accommodate ROPS and non-ROPS applications. For example, in some embodiments, mounting plate 154 includes a ROPS plate with an elastomer snubbing section (e.g., an elastomeric profile 156) bonded thereto for motion control in both the axial and radial directions. In other embodiments, mounting plate 154 includes a non-ROPS plate with an elastomer snubbing section bonded thereto. One difference between a ROPS and a non-ROPS version of mounting plate 154 is that for a non-ROPS version, broadband damping fluid mount 100 is fit with a thinner, less expensive mounting plate 154. For a ROPS version, mounting plate 154 is thicker and stronger and includes the ability to carry the required ROPS loads (See, e.g., FIG. 5).

Likewise, mounting plate 154 and/or elastomeric profile 156 of the top plate assembly are interchangeable and/or modular for use in ROPS and non-ROPS applications. In a ROPS version, for example, the load path goes directly from top plate assembly 150, through inner member 110, to the ROPS-type version of mounting plate 154, and then to a supporting frame structure S2. This separates the ROPS loading from the static and dynamic performance features of device 100, allowing the ROPS capability of the mount to be added or removed by simply changing mounting plate 154 and inner member 110 material of broadband damping fluid mount 100. This allows the ROPS capability of this mount to be truly modular by component replacement. Interchangeable top plate assembly 150 comprises an elastomeric profile 156 having a central aperture therethrough.

In one aspect, a damping plate 140 is attached at a bottom portion of the inner member 110. For example, in several embodiments the damping plate 140 is attached to the bottom portion of the inner member 140 by a radial rivet, a smashing projection, or a bolted joint, although other such approaches and structures can be sufficient (e.g., FIG. 2).

As shown in FIG. 2, a bonded core that includes the inner member 110 and the elastomer section 130 is snuggly contained within the crimped cup 200 that optionally includes either one or both of a flange 210 formed on an upper portion of the cup and/or a substantially flat bottom surface 220. The crimped cup 200 additionally contains a quantity of viscous fluid 300, which provides damping in the fluid mount 100. For example, when the bonded core is placed within the cup 200, the quantity of fluid 300 is disposed beneath the damping plate 140. Thus, the quantity of viscous fluid 300 and the damping plate 140 act as a dashpot damper by allowing fluid flow around an outer diameter of the damping plate 140 (i.e. annular damping). Where holes (not shown) are included in the damping plate 140, the damping plate 140 further exhibits orifice damping as the quantity of viscous fluid 300 flows through the holes in the damping plate 140. In this case, the dashpot damper dissipates the overall energy of the system and creates softer mount stiffness for equivalent motion control. In some embodiments, air is present on both sides of the damping plate 140 (i.e., above the damping plate 140, but below a bottom of the elastomer contour 134, and below the damping plate 140 in the blind threaded hole 112 of the inner member 110).

However, increasing the overall damping of a system can result in increased dynamic stiffness. Therefore, in order to increase overall system damping and maintain isolation, a low-amplitude decoupler can be used to reduce the damping at low-amplitude, high frequency input. One means of achieving decoupling is to have the bottom 220 of the cup be a substantially flat surface. The flat surface provides decreased volume stiffness for the quantity of viscous fluid 300 disposed below the damping plate 140, thereby providing improved high-frequency isolation. Alternatively or in addition, the volume of the viscous fluid 300 is selected so that a certain percentage of air is present in the fluid cavity to allow deflection even at frequencies at which the damping fluid 300 may get very stiff (such as at the annular and/or orifice damping interfaces).

Figure 3:
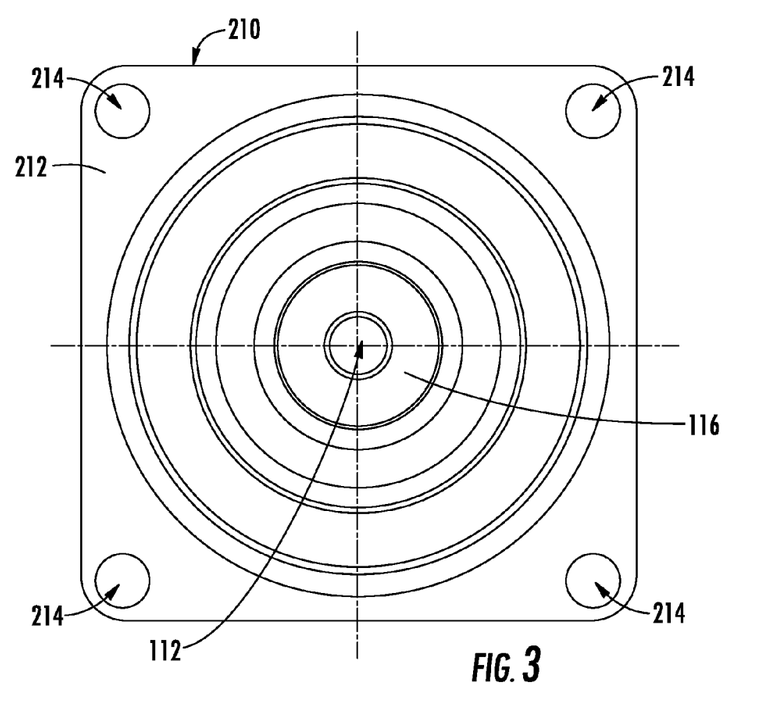
FIG. 3 is a top view of a damping fluid mount according to an embodiment of the presently disclosed subject matter.

In some embodiments, flange 210 has a square mounting surface 212 for attachment of the broadband damping fluid mount 100 to supporting frame structure S2. However, any shape mounting surface will suffice. The flange 210 includes a plurality of mounting holes 214 disposed on the square mounting surface 212 (e.g. FIGS. 3 and 4). In such an embodiment, the flange 210 has four holes 214 at each of the corners of the square mounting surface 212 of the flange 210; but any combination of mounting surface shape and number of holes is acceptable.

Furthermore, the radially crimped cup 200 securely contains the bonded core within it. Once the bonded core is inserted into the interior of the cup 200, the cup 200 is radially crimped into the elastomer contour 134 so that the (optional) ring 120 and the bonded core are crimped inside of the cup 200. In some embodiments, a collet swage machine is used to radially crimp cup 200, which achieves large deformations in the cup 200 while minimizing distortion and wall thinning. Alternatively, in other embodiments, hydro-forming is used to crimp cup 200. Roll forming is another method of crimping cup 200, but it has the risk of thinning the cup wall and limiting the depth of the allowable deformation in the cup 200.

Specifically, radially crimping the cup 200 into the elastomer contour 134 improves on other vibration damping fluid mounts. In the embodiments disclosed herein the need for an outer member is reduced or eliminated since the radially crimped cup 200 performs the same functions as the outer member, while increasing the durability of the overall fluid mount 100. (See, for e.g. FIG. 2).

Figure 6:
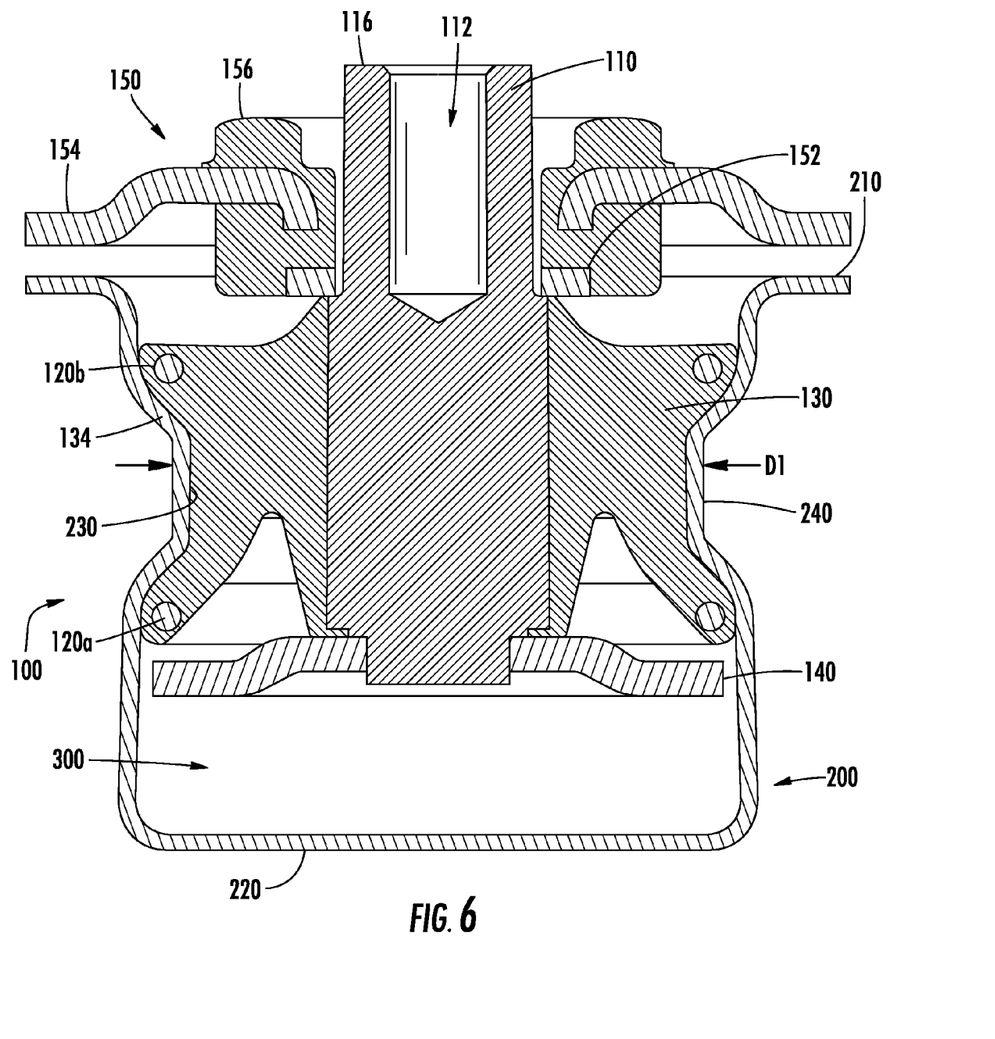
FIG. 6 is a sectional side view showing a damping fluid mount according to an embodiment of the presently disclosed subject matter.

FIG. 6 is a sectional view of an assembled broadband damping fluid mount 100. In this configuration, after inserting inner member 110, elastomer section 130, and damping plate 140 into cup 200 as illustrated in FIG. 2, top plate assembly 150 is then provided over portions of inner member 110, elastomer section 130, and cup 200. Inner member 110 is received by the central aperture of top plate assembly 150 and retained therein (e.g., FIGS. 7A and 7B). Metallic washer 152 is configured to physically contact a surface of the inner member 110 and/or an upper portion of elastomer section 130 for upward snubbing. In some embodiments, metallic washer 152 further provides stiffness control and an upward snubbing contact surface. An upward snubbing response can be altered via altering the diameter of metallic washer 152 bonded to elastomeric profile 156.

The overall fluid mount 100 has increased durability from radially crimping the cup 200, since radially crimping the cup 200 both radially precompresses the elastomer section 130 and radially crimps an inner surface 230 of the crimped cup 200, such that the elastomer contour 134 and the inner surface 230 of crimped cup 200 have a substantially similar contour. However, the substantial similarity contours between elastomer contour 134 and the inner surface 230 of crimped cup 200 are not absolutely necessary due to the incompressible nature of elastomer section 130. The relative motion at the interface between the elastomer contour 134 and the inner surface 230 of the crimped cup 200 are substantially minimized. A precompressed friction interface has been previously used for elastomeric mounts, but precompressed friction interface are not known to be used for elastomeric mounts used in fluid mounts, as disclosed herein.

In the embodiment illustrated inner surface 230 of crimped cup 200 stretches elastomer contour 134 in the axial direction to minimize the relative motion at the interface. By integrating the ring 120 into the elastomer contour 134 the relative motion at the interface virtually diminishes, thus providing even more increased durability of the overall fluid mount 100. A second ring (See, e.g., FIG. 5) can be added above the elastomer contour 134 and provide a higher reduction in relative motion.

Radial precompression of the elastomer section 130 further reduces relative motion, improves fatigue life, and provides superior sealing of the overall fluid mount 100. The particular degree of precompression can be designed to provide the desired response in the elastomer section 130. In some configurations, for example, radial precompression of the elastomer section 130 ranges from approximately 5% of the original (i.e., uncompressed) elastomer section wall thickness to approximately 30% of original elastomer section wall thickness. In some particular examples, the percentage of radial precompression is between approximately 12% and 20% of the original elastomer wall thickness. Consequently, where the ring 120 is integrated within the elastomer contour 134, between approximately 12% and 20% radial precompression of the elastomer section 130 results in a significant reduction in relative motion at the interface, such that the axial position at the interface will not substantially change over time, which will result in an improved durability resulting from reduced wear at the interface. That being said, those having skill in the art will recognize that the amount of precompression is adjustable to adapt fluid mount 100 to different desired static and/or snubbing load responses. In addition, by selecting the properties of the elastomer section 130 prior to manufacture, the 1G static load rating of the fluid mount 100 can be adjusted from its largest load rating to its smallest load rating (e.g., by adjusting the modulus of the elastomer section 130).

Further, radial precompression of the elastomer section 130 provides improved sealing of the viscous fluid 300 inside the fluid mount 100. Traditionally, sealing a specified volume of viscous fluid within an interior of a fluid mount has been accomplished by using sealing beads incorporated into the outer contours of the elastomer. Maintaining the specified volume of viscous fluid within the fluid mount is desirable because of the damping accomplished by the viscous fluid and the damping plate acting in combination as a dashpot damper. Even small quantities of leakage of the viscous fluid impacts the efficiency and ability of the fluid mount to control and reduce gross vehicle cab movement and vibration. Therefore, radially precompressing the elastomer section 130 provides superior sealing of the broadband damping fluid mount 100, as disclosed herein, because the elastomer section 130 is compressed to a higher percentage and over a larger area than traditional sealing beads typically allow. Radial precompression of between about 12% and 30% of the elastomer section 130 provides effective sealing, although radial precompression substantially between 5% and 30% can also be sufficient. The use of traditional sealing beads incorporated into the outer elastomer contour 134, in addition to radial precompression of the elastomer 130, provides for similar results. The radial precompression of the elastomer section 130 provides sealing even during use in low-temperature environments affecting the different materials' coefficient of thermal expansion. This approach creates a tight seal over a large area. In addition, in some embodiments, a vacuum is used during the assembly process to control the amount of negative or positive pressure in the assembled mount.

In another aspect, radially crimping the cup 200 provides an additional effect that has safety benefits. When the cup 200 is radially crimped, the cup 200 has a smaller diameter at the crimped portion than the outer diameter of the damping plate 140 (e.g. FIG. 2). This acts as a safety precaution by preventing separation of the damping plate 140 from the cup 200, even if elastomeric failure were to occur. Further, the decreased diameter D1 resulting from radially crimping the cup 200 also operates to react the downward and upward snubbing loads. The wall of the crimped cup between the original cup diameter D0 and the crimped cup diameter D1 react with the snubbing load transmitted into the precompressed elastomer section 130 from the inner member 110 and snubbing elements.

As discussed above, snubbing is an increase in overall mount stiffness caused by engaging stiffer elements after a certain deflection. In this case, for example, where fluid mount 100 is secured to a supporting structure S1 as shown in FIG. 4, after a certain downward deflection, supporting structure S1 engages an upper portion of elastomer section 130, and the downward mount stiffness increases. Similarly, after a certain upward deflection, the damping plate 140 engages the bottom portion of elastomer section 130 and the upward mount stiffness increases. In either event, the crimped cup 200 provides a surface (angled) that reacts the load in each of these upward and downward snubbing portions of the elastomer 130. Snubbing is beneficial in broadband fluid mounts used in cab mount applications because it helps to limit overall cab motion.

Referring to FIG. 6, a method of assembly includes a bonded core that includes an inner member 110, a ring 120, and an elastomer section 130, and a damping plate 140. The bonded mount is manufactured by adding the inner member and the ring into a mold. The inner member 110 and ring 120 are provided with proper surface preparation and adhesive applied. Proper surface preparation is known those skilled in the relevant art. The mold closes and the elastomer is injected into the cavity and cured, thus curing the elastomer and adhesive. After the cured mount is removed from the mold, the damping plate 140 is inserted onto the boss at the bottom of the inner member and the boss is permanently deformed to retain the damping plate 140. This deformation is accomplished by radial riveting or orbital riveting, but can also be accomplished with a hydraulic press and either flat or angled pusher.

A cup 200 manufactured to the desired tolerances is filled with a specified quantity of viscous fluid 300 such that the bonded core fits within the cup 200 (e.g. FIGS. 6 and 7). The cup 200 is then radially crimped into the bonded core so that the elastomer section 130 and the ring 120 are radially precompressed (e.g. FIG. 2) and axially stretched. The crimp axial length may actually be longer than the axial length of the molded undercut, thereby axially stretching the elastomer at the interface.

In one aspect, as shown in FIG. 2, the elastomer contour 134 is formed with a diameter that varies from a point substantially below the square-mounting surface 212 of the flange 210 to a point on the elastomer contour 134 above the damping plate 140. The transitions on the elastomer contour 134 from one diameter to another can be substantially smooth. Therefore, when the cup 200 is crimped into the elastomer contour 134, the cup 200 mimics the elastomer contour 134 and is radially crimped in at least two places, such that a crimped area is formed that is substantially parallel with the longitudinal axis of the inner member 110. At the crimped area, the cup 200 has the narrowest diameter (e.g., crimped cup diameter D1 illustrated in FIG. 2). Additionally, the cup 200 is crimped to mimic the elastomer contour 134, such that the external surface 240 of the cup 200 has a smooth transitional contour from the non-crimped areas of the cup 200 to the crimped area of the cup (and vice versa), in view of the smooth transitional elastomer contour 134. Alternatively, in some configurations, elastomer contour 134 has a more abrupt transitional profile, and thus when the cup 200 is crimped to mimic the elastomer contour 134, the external surface 240 of the cup 200 has a more abrupt transitional contour from the non-crimped areas of the cup 200 to the crimped area of the cup (and vice versa).

The present subject matter can be embodied in other forms without departing from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A damping fluid mount comprising:
   an inner member;
   an elastomer section that is affixed to an outer surface of the inner member, wherein the elastomer section has an outer diameter that is variable along an elastomer contour;
   a cup containing viscous fluid, a crimped portion of the cup being radially crimped into the elastomer section such that the crimped portion radially precompresses the elastomer section, and decreases an inner diameter of the crimped portion of the cup; and
   a ring integrated within the elastomer contour and crimped to conform to the elastomer contour; wherein a diameter of the ring is greater than the inner diameter of the crimped portion of the cup.

2. The damping fluid mount of claim 1, wherein the elastomer section is bonded to the outer surface of the inner member.

3. The damping fluid mount of claim 1, wherein the elastomer section is rigidly secured to the outer surface of the inner member.

4. The damping fluid mount of claim 1, wherein the elastomer section comprises an elastomer material selected to have an elastic modulus corresponding to a desired 1G static load rating.

5. The damping fluid mount of claim 1, wherein radial precompression of the elastomer section ranges between about 5% and about 30% of an uncompressed thickness of the elastomer section.

6. The damping fluid mount of claim 5, wherein radial precompression of the elastomer section is between about 12% and about 20% of the uncompressed thickness of the elastomer section.

7. The damping fluid mount of claim 1, wherein the cup contains a ratio of viscous fluid and air corresponding to a desired load response at expected operating frequencies.

8. The damping fluid mount of claim 1, wherein the cup comprises a substantially flat bottom surface.

9. The damping fluid mount of claim 1, further comprising an annular damping plate attached to a bottom portion of the inner member; wherein an outer diameter of the annular damping plate is greater than an inner diameter of the crimped portion of the cup.

10. The damping fluid mount of claim 1, wherein the inner member includes a blind hole that longitudinally extends from a top surface of the inner member to a center of the inner member.

11. The damping fluid mount of claim 1, wherein the cup comprises a flange with a substantially square-shaped mounting surface disposed on a top rim of the cup.

12. A method for assembling a damping fluid mount comprising the steps of:
    coupling an elastomer section to an outer surface of an inner member;
    inserting the elastomer section coupled to the inner member into a cup, wherein the cup contains a quantity of viscous fluid;
    radially crimping a portion of the cup to form a crimped portion that extends into an elastomer contour disposed on an exterior surface of the elastomer section, wherein crimping the portion of the cup radially precompresses the elastomer section and decreases an inner diameter of the crimped portion of the cup; and
    integrating a ring into the elastomer contour, wherein a diameter of the ring is greater than the inner diameter of the crimped portion of the cup.

13. The method for assembling the damping fluid mount of claim 12, wherein coupling the elastomer section to the outer surface of the inner member comprises bonding the elastomer section to the outer surface of the inner member.

14. The method for assembling the damping fluid mount of claim 12, wherein coupling the elastomer section to the outer surface of the inner member comprises rigidly securing the elastomer section to the outer surface of the inner member.

15. The method for assembling the damping fluid mount of claim 12, wherein precompressing the elastomer section provides a precompression having a range between about 15% and about 25% of an uncompressed thickness of the elastomer section.

16. The method for assembling the damping fluid mount of claim 15, wherein precompressing the elastomer section provides a radial precompression of the elastomer section of about 20% of the uncompressed thickness of the elastomer section.

17. The method for assembling the damping fluid mount of claim 12, further comprising coupling a damping plate to a bottom portion of the inner member prior to inserting the elastomer section coupled to the inner member into the cup.

18. The method for assembling the damping fluid mount of claim 12, further comprising applying a vacuum during one or more of the steps of inserting the elastomer section coupled to the inner member into a cup or radially crimping a portion of the cup; wherein a pressure in the damping fluid mount is controlled to be at a desired value.

* * * * *